(12) United States Patent
Tomabechi

(10) Patent No.: US 11,265,188 B2
(45) Date of Patent: Mar. 1, 2022

(54) MESHED VIRTUAL PRIVATE NETWORK SYSTEM

(71) Applicant: YUGEN KAISHA TOMABECHIAN, Tokyo (JP)

(72) Inventor: Hideto Tomabechi, Tokyo (JP)

(73) Assignee: YUGEN KAISHA TOMABECHIAN, Tokyo (JP)

(*) Notice: Subject to any disclaimer, the term of this patent is extended or adjusted under 35 U.S.C. 154(b) by 58 days.

(21) Appl. No.: 16/930,280

(22) Filed: Jul. 15, 2020

(65) Prior Publication Data

US 2021/0367809 A1 Nov. 25, 2021

(51) Int. Cl.
*H04L 12/46* (2006.01)
*H04L 9/06* (2006.01)
*H04W 84/18* (2009.01)

(52) U.S. Cl.
CPC ........ *H04L 12/4641* (2013.01); *H04L 9/0637* (2013.01); *H04W 84/18* (2013.01); *H04L 2209/38* (2013.01)

(58) Field of Classification Search
CPC . G05B 19/4184; G06F 21/567; G06F 21/554; H04L 41/0846; H04L 41/0886; H04L 63/08; B06W 60/0011; H04W 12/06
See application file for complete search history.

(56) References Cited

U.S. PATENT DOCUMENTS

| 9,276,818 | B2 | 3/2016 | Turon et al. |
| 9,300,581 | B1 | 3/2016 | Hui et al. |
| 9,344,365 | B1 | 5/2016 | Hui et al. |
| 9,351,232 | B2 | 5/2016 | Turon et al. |
| 9,363,732 | B2 | 6/2016 | Turon et al. |
| 9,363,733 | B2 | 6/2016 | Turon et al. |
| 9,369,374 | B1 | 6/2016 | Hui et al. |
| 9,385,953 | B1 | 7/2016 | Hui et al. |
| 9,408,133 | B2 | 8/2016 | Turon et al. |
| 9,413,613 | B2 | 8/2016 | Turon et al. |
| 9,621,462 | B2 | 4/2017 | Hui et al. |
| 9,628,338 | B2 | 4/2017 | Turon et al. |
| 9,948,516 | B2 | 4/2018 | Turon et al. |
| 9,999,090 | B2 | 6/2018 | Turon et al. |
| 10,567,280 | B2 | 2/2020 | Hui et al. |

(Continued)

FOREIGN PATENT DOCUMENTS

| JP | 2019-062544 A | 4/2019 |
| JP | 2019-092142 A | 6/2019 |

(Continued)

OTHER PUBLICATIONS

Extended European Search Report issued in European Application No. 20189104.1, dated Jan. 12, 2021 (10 pages).

*Primary Examiner* — Iqbal Zaidi
(74) *Attorney, Agent, or Firm* — Nakanishi IP Associates, LLC

(57) ABSTRACT

A meshed virtual private network system includes L junction nodes each including a device being capable of making a radio VPN communication and each being registered in advance, wherein L is an integer equal to or greater than 2, and a database, the meshed virtual private network system making communication to a receiver node from a sender node through the junction nodes, each of the junction nodes being capable of acting as a VPN server by carrying out predetermined steps.

16 Claims, 3 Drawing Sheets

(56) References Cited

U.S. PATENT DOCUMENTS

| | | |
|---|---|---|
| 2015/0372875 A1 | 12/2015 | Turon et al. |
| 2015/0372876 A1 | 12/2015 | Turon et al. |
| 2015/0373691 A1 | 12/2015 | Turon et al. |
| 2015/0373750 A1 | 12/2015 | Turon et al. |
| 2015/0373751 A1 | 12/2015 | Turon et al. |
| 2015/0373752 A1 | 12/2015 | Turon et al. |
| 2015/0373753 A1 | 12/2015 | Turon et al. |
| 2016/0014671 A1 | 1/2016 | Turon et al. |
| 2016/0029290 A1 | 1/2016 | Turon et al. |
| 2016/0226761 A1 | 8/2016 | Hui et al. |
| 2016/0294793 A1 | 10/2016 | Larson et al. |
| 2017/0086092 A1 | 3/2017 | Kim et al. |
| 2017/0222923 A1 | 8/2017 | Hui et al. |
| 2018/0242379 A1 | 8/2018 | Turon et al. |
| 2019/0149957 A1 | 5/2019 | Raza et al. |
| 2021/0334375 A1* | 10/2021 | Hu .................... G06F 21/567 |

FOREIGN PATENT DOCUMENTS

| | | |
|---|---|---|
| JP | 2019-126087 A | 7/2019 |
| JP | 2019-176361 A | 10/2019 |
| JP | 2019-216445 A | 12/2019 |

\* cited by examiner

MESHED VIRTUAL PRIVATE NETWORK SYSTEM

BACKGROUND OF THE INVENTION

Field of the Invention

The invention relates to a meshed virtual private network system, and more particularly to a node acting as an access point in a meshed virtual private network.

Description of the Related Art

A meshed network has been recently suggested as one of communication networks.

A meshed network includes a plurality of junction devices (nodes). The junction devices are designed to be equal to one another, and define a mesh-shaped communication path. Data is transmitted from a sender in zigzags finally to a receiver through a certain route in the mesh-shaped communication path. Metaphorically, data is transmitted in bucket-brigade to a receiver from a sender.

Many suggestions have been made with respect to a meshed network. For instance, Japan Patent Application Publications No. 2019-062544, 092142, 126087, 176361 and 216445 have suggested a meshed network.

The above-identified Publications fail to disclose a specific structure of a node acting as a part of a meshed network. A node is generally comprised of a fixed server. Herein, a fixed server indicates a server installed at a predetermined place and not intended to move therefrom.

In order to establish a meshed network, it is necessary to have a plurality of such servers, and to find spaces for installing the servers. Accordingly, an initial cost for building a meshed network is unavoidably huge.

Furthermore, since each of servers defining a meshed network needs a non-small amount of electric power, a total amount of electric power consumed by all servers is unavoidably huge.

An existing VPN (Virtual Private Network) service is designed to operate by means of thousands of to ten thousands of servers present all over the world. These VPN servers are all fixed ones. Fixed VPN servers are unavoidably accompanied with a problem about fragility in security, caused by fixation of servers.

In addition, since VPN servers used in VPN service are used only for VPN service, it cannot be said that VPN servers are effectively used. More generally, there is caused a problem that device resources are not effectively used.

SUMMARY OF THE INVENTION

In view of the above-mentioned problems in a conventional node defining a meshed network and further problems in existing VPN servers, it is an exemplary object of the present invention to provide a solution to the problems. The problems accompanied with a conventional node in a meshed network can be solved, for instance, by defining a node with a VPN server.

Herein, VPN means a technology for extending a private network over an Internet, or an extended private network itself. VPN accomplishes a condition that a private network such as an intranet overlaps an Internet, an originally public network, and thus, is connected with another private network through an exclusive communication path. Thus, a user can make communication much upgraded with respect to function and security.

However, even if a plurality of VPN servers were prepared and installed at different sites, there would be caused the same problems as those accompanied with a conventional fixed server. Thus, the present invention makes it possible to use a radio-signal communication device (for instance, a cellular or mobile phone) as a VPN server to thereby solve the above-mentioned problems in the conventional art.

In addition, the present invention configures a communication path defined by VPN servers to be a meshed virtual private network, ensuring that security in communication can be much improved.

Specifically, the present invention provides a meshed virtual private network system, a node acting as an access point in a meshed virtual private network, a method of making communication between nodes in a meshed virtual private network, and a non-transitory storage medium storing therein a program to be installed in a node.

In a first exemplary aspect of the present invention, there is provided a meshed virtual private network system including L junction nodes each comprising a device being capable of making a radio VPN communication and each being registered in advance, wherein L is an integer equal to or greater than 2, and a database, the meshed virtual private network system making communication to a receiver node from a sender node through the junction nodes, wherein the L junction nodes each writes either on-line status relating information to the database when it is on-line, or off-line status relating information to the database when it is off-line, when the sender node intends to make communication to the receiver node through the junction nodes, the sender node makes access to the database to pick up N junction nodes among junction nodes being on-line, wherein N is an integer equal to or greater than 2, the sender node repeats making access to any one of the N junction nodes, and making access to any one of the remaining (N−1) junction nodes, if the junction node to which the sender node made first access is busy, to thereby pick up a non-busy junction node as a first junction node, and then, establish a communication path to the first junction node, the first junction node carries out a negotiation having been carried out between the sender node and the first junction node, to another junction node to thereby pick up a second junction node and establish a communication path to the second junction node, the first junction node transmits information stored in itself to the second junction node, the information including information having been received from the sender node, thereafter, the M-th junction node repeats carrying out the negotiation to a junction node other than the first to the (M−1)-th junction nodes to thereby pick up a (M+1)-th junction node and establish a communication path to the (M+1)-th junction node, wherein M is an integer equal to or greater than 2, the M-th junction node transmits information to the (M+1)-th junction node, the information including both information stored in itself and information stored in the first to the (M−1)-th junction nodes present in the communication path having been established so far, a junction node which recognizes itself as a final junction node, based on the information having been received from the immediately previous junction node, in accordance with a judgment logic for judging whether a junction node is a final one, makes access to the receiver node, each of the junction nodes functions as a VPN server.

It is preferable that the sender node, when the N junction nodes are all busy, carries out the same process to remaining junction nodes other than the N junction nodes.

It is preferable that each of the junction nodes includes a radio-signal communication device moving at real-time.

It is preferable that each of the junction nodes includes a cellular phone.

It is preferable that each of the junction nodes includes an IoT device.

It is preferable that the database includes a block-chain.

In a second exemplary aspect of the present invention, there is provided a method of causing a junction node to act as a VPN server in a meshed virtual private network including a plurality of junction nodes each comprising a device being capable of making a radio VPN communication, and a database, the meshed virtual private network making communication to a receiver node from a sender node through the junction nodes, the method including a first step of writing either on-line status relating information to the database when each of the junction nodes is on-line, or off-line status relating information to the database when each of the junction nodes is off-line, the first step being carried out by each of the junction nodes, a second step of, when the sender node intends to make communication to the receiver node through the junction nodes, making access to the database to pick up N junction nodes among junction nodes being on-line, wherein N is an integer equal to or greater than 2, the second step being carried out by the sender node, a third step of repeating making access to any one of the N junction nodes, and making access to any one of the remaining (N−1) junction nodes, if the junction node to which the sender node made first access is busy, to thereby pick up a non-busy junction node as a first junction node, and then, establish a communication path between the sender node and the first junction node, the third step being carried out by the sender node, a fourth step of carrying out a negotiation having been carried out between the sender node and the first junction node, to another junction node to thereby pick up a second junction node and establish a communication path between the first junction node and the second junction node, the fourth step being carried out by the first junction node, a fifth step of transmitting information stored in the first junction node to the second junction node, the information including information having been received from the sender node, the fifth step being carried out by the first junction node, a sixth step of repeating carrying out the negotiation to a junction node other than the first to a (M−1)-th junction nodes to thereby pick up a (M+1)-th junction node and establish a communication path between a M-th junction node the (M+1)-th junction node, wherein M is an integer equal to or greater than 2, the sixth step being carried out by the M-th junction node, a seventh step of transmitting information to the (M+1)-th junction node, the information including both information stored in the M-th junction node and information stored in the first to the (M−1)-th junction nodes present in the communication path having been established so far, the seventh step being carried out by the M-th junction node, and an eighth step of making access to the receiver node, the eighth step being carried out by a junction node which recognizes itself as a final junction node, based on the information having been received from the immediately previous junction node, in accordance with a judgment logic for judging whether a junction node is a final one.

In a third exemplary aspect of the present invention, there is provided a junction node to be used in a meshed virtual private network including a plurality of junction nodes each comprising a device being capable of making a radio VPN communication, and a database, the meshed virtual private network making communication to a receiver node from a sender node through the junction nodes, the junction node including a first unit writing either on-line status relating information to the database when the junction node is on-line, or off-line status relating information to the database when the junction node is off-line, a second unit, and a third unit, wherein when the sender node intends to make communication to the receiver node through the junction nodes, the sender node makes access to the database to pick up N junction nodes among junction nodes being on-line, wherein N is an integer equal to or greater than 2, and then, repeats making access to any one of the N junction nodes, and making access to any one of the remaining (N−1) junction nodes, if the junction node to which the sender node made first access is busy, to thereby pick up a non-busy junction node as a first junction node, thereafter, the second unit in the first junction node establishes a communication path to the sender node, the second unit in the first junction node further carries out a negotiation having been carried out between the sender node and the first junction node, to another junction node to thereby pick up a second junction node and establish a communication path to the second junction node, the third unit in the first junction node transmits information stored in the first junction node to the second junction node after the communication path has been established between the first and second junction nodes, the information including information having been received from the sender node, the second unit in a M-th junction node repeats carrying out the negotiation to a junction node other than the first to a (M−1)-th junction nodes after a communication path with the immediately previous (M−1)-th junction node has been established, to thereby pick up a (M+1)-th junction node and establish a communication path to the (M+1)-th junction node, wherein M is an integer equal to or greater than 2, the third unit in the M-th junction node transmits information to the (M+1)-th junction node after a communication path has been established between the M-th and (M+1)-th junction nodes, the information including both information stored in the M-th junction node and information stored in the first to the (M−1)-th junction nodes present in the communication path having been established so far, the second unit in a junction node which recognizes itself as a final junction node, based on the information having been received from the immediately previous junction node, in accordance with a judgment logic for judging whether a junction node is a final one, establishes a communication path with the receiver node, each of the junction nodes functions as a VPN server.

In a fourth exemplary aspect of the present invention, there is provided a non-transitory storage medium readable by a computer and storing a program therein in a meshed virtual private network including a plurality of junction nodes each comprising a device being capable of making a radio VPN communication, and a database, the meshed virtual private network making communication to a receiver node from a sender node through the junction nodes, wherein the program is stored in each of the junction nodes, and causes each of the junction nodes to act as a VPN server, the program causes each of the junction nodes to carry out a first action of writing either on-line status relating information to the database when a junction node including the program is on-line, or off-line status relating information to the database when off-line, when the sender node intends to make communication to the receiver node through the junction nodes, the sender node makes access to the database to pick up N junction nodes among junction nodes being on-line, wherein N is an integer equal to or greater than 2, and then, repeats making access to any one of the N junction nodes, and making access to any one of the remaining (N−1) junction nodes, if the junction node to which the sender node made first access is busy, to thereby pick up a non-busy junction node as a first junction node, a second action of causing the first junction node to establish a communication path to the sender node, a third action of causing the first junction node to carry out a negotiation having been carried out between the sender node and the first junction node, to another junction node to thereby pick up a second junction node and establish a communication path between the first junction node and the second junction node, a fourth action of causing the first junction node to transmit information stored in the first junction node to the second junction node, the information including information having been received from the sender node, a fifth action of causing a M-th junction node to repeat carrying out the negotiation to a junction node other than the first to a (M−1)-th junction nodes to thereby pick up a (M+1)-th junction node and establish a communication path between the M-th junction node the (M+1)-th junction node, wherein M is an integer equal to or greater than 2, a sixth action of causing the M-th junction node to transmit information to the (M+1)-th junction node, the information including both information stored in the M-th junction node and information stored in the first to the (M−1)-th junction nodes present in the communication path having been established so far, and a seventh action of causing a junction node which recognizes itself as a final junction node, based on the information having been received from the immediately previous junction node, in accordance with a judgment logic for judging whether a junction node is a final one, to make access to the receiver node.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Exemplary embodiments in accordance with the present invention will be explained hereinbelow with reference to drawings.

Figure 1:
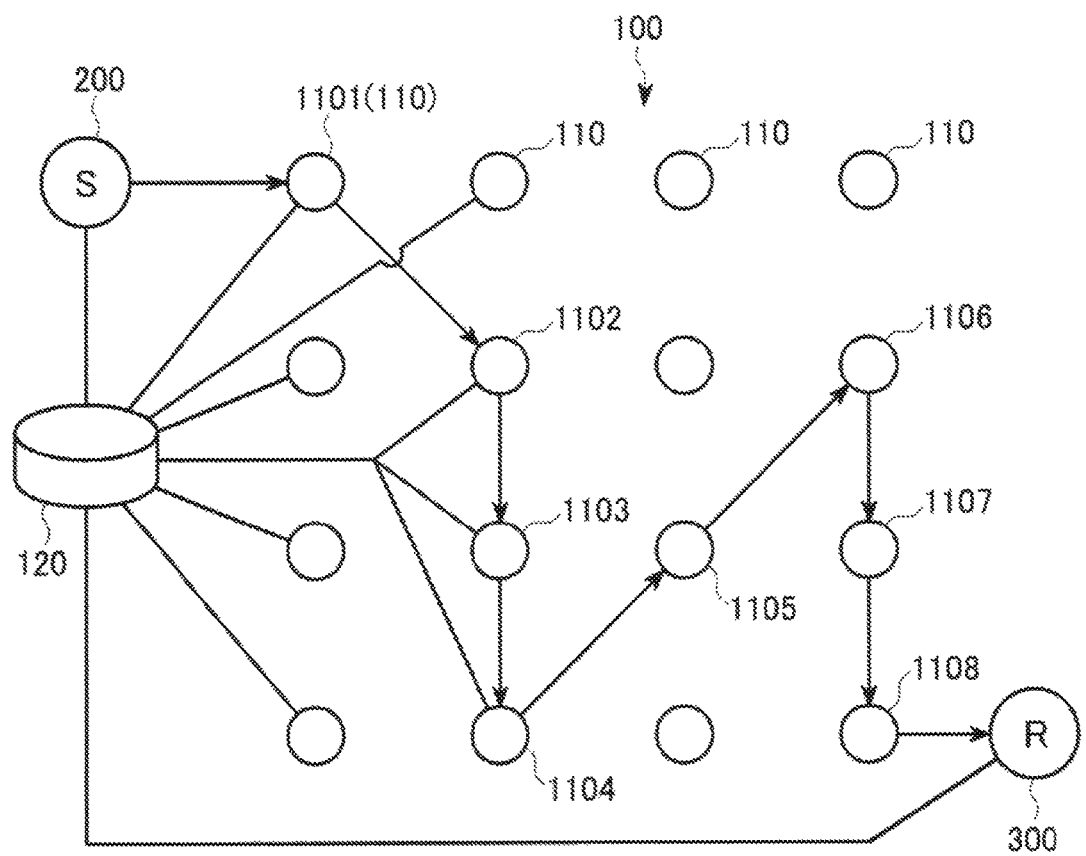
FIG. 1 illustrates a concept of a meshed virtual private network system in accordance with an embodiment of the present invention.

FIG. 1 is a conceptual diagram of a meshed virtual private network system 100 in accordance with an exemplary embodiment of the present invention.

As illustrated in FIG. 1, the meshed virtual private network system 100 includes, at least, L junction nodes 110, and a database 120, wherein L indicates an integer equal to or greater than 2 ($L \geq 2$).

In the meshed virtual private network system 100, communication is made to a receiver node 300 from a sender node 200 through T junction nodes 110 selected among the L junction nodes 110, wherein T is an integer and is equal to or smaller than L ($T \leq L$). The T junction nodes define a communication path from the sender node 200 to the receiver node 300. Different communication paths are defined in each communication to be made between the sender node 200 and the receiver node 300.

Each of the junction nodes 110 is comprised of a device capable of making radio-communication, and thus, is able to transmit and receive radio signals. The L junction nodes 110 are in advance registered for being used in the meshed virtual private network system 100.

The database 120 is connected with each of the L junction nodes 110, the sender node 120 and the receiver node 130. In FIG. 1, for the purpose of avoiding complexity in the drawing, the database 120 is illustrated to connect with some of the L junction nodes 110. The junction nodes 110, the sender node 120 and the receiver node 130 can write data into the database 120, and read necessary data out of the database 120.

Figure 2:
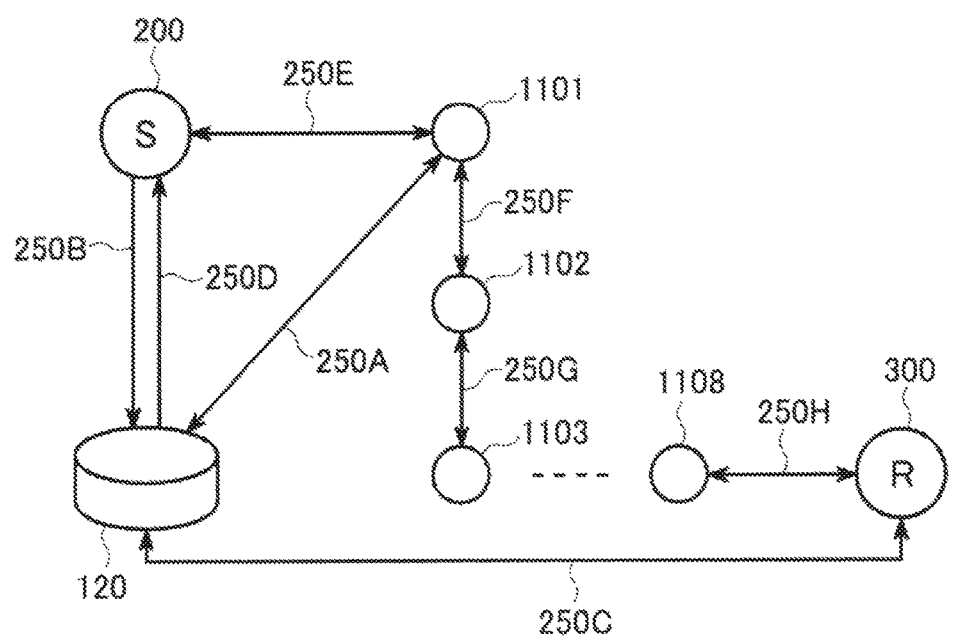
FIG. 2 illustrates a concept of communication among a sender node, a database, and junction nodes.
Figure 3:
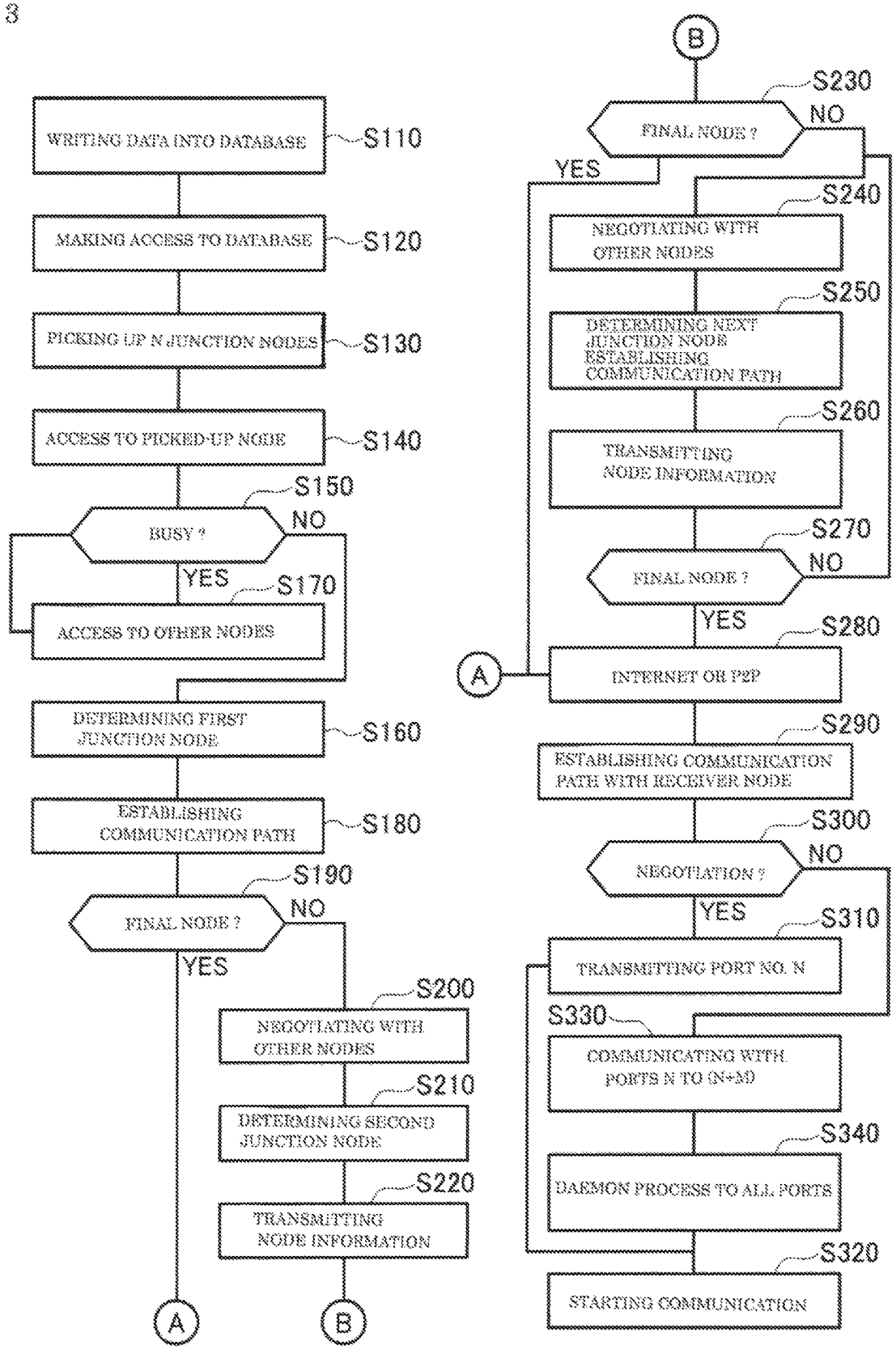
FIG. 3 is a flow-chart showing the operation of the meshed virtual private network system illustrated in FIG. 1.

FIG. 2 conceptually illustrates the communication made between the sender node 200 and the database 120, and each of the junction nodes 110, and FIG. 3 is a flow-chart showing steps to be carried out by the meshed virtual private network system 100 in accordance with the embodiment. Hereinbelow is explained the operation of the meshed virtual private network system 100 with reference to FIGS. 1 to 3.

It is supposed in the case described hereinbelow that communication is made to the receiver node 300 from the sender node 200 through eight junction nodes 110 as a result, specifically, junction nodes 1101 to 1108.

As detailed later, each of the junction nodes 110 in the meshed virtual private network system 100 is able to act as a VPN server.

Each of the L junction nodes 110 (see an arrow 250A in FIG. 2, and the arrow is illustrated only with respect to a later-mentioned first junction node 1101 in FIG. 2), the sender node 200 (see an arrow 250B in FIG. 2), and the receiver node 300 (see an arrow 250C in FIG. 2) are designed to write information relating to on-line status into the database 120, when itself is on-line (see step S110 in FIG. 3).

The on-line status relating information includes following information.

(1) Status of itself is ON.

(2) A name of a place where it is now present. The name includes at least names of a country and a city.

(3) ID of itself. Herein, ID is identical with a public key.

(4) GMT (Greenwich mean time) at which the status of itself has turned ON.

(5) VPN map address of itself. This VPN map address is later converted into an IP address in accordance with a predetermined function.

(6) Port numbers of N-th to (N+M)-th ports. N and M are both integers.

(7) VPN protocol to be used. For instance, IKEv 2 may be used as VPN protocol.

(8) Network speed (Mbps).

(9) Information for authentication. This information is required only when authentication is carried out, if necessary.

Each of the L junction nodes 110 is further designed to write information relating to off-line status into the database 120, when itself is off-line or a communication speed is smaller than a predetermined speed (step S110).

The off-line status relating information includes following information.

(1) Status of itself is OFF.
(2) GMT (Greenwich mean time) at which the status of itself has turned OFF.
(3) VPN map address of itself (IP address).

When the sender node 200 is going to make communication with the receiver node 300, the sender node 200 first makes access to the database 120 (see an arrow 250B in FIG. 2 and step S120 in FIG. 3), and then, picks up N nodes meeting with the requirement, among the junction nodes 110 being on-line status (step S130), wherein N is an integer equal to or greater than 2. Data about the thus picked-up N junction nodes 110 is transmitted to the sender node 200 from the database 120 (see an arrow 250D in FIG. 2).

The sender node 200 makes access to a junction node randomly selected among the N junction nodes 110, unless the selected junction node is turned off-line after having been selected (step S140).

If the junction node 110 to which the sender node 200 has made access is not busy (NO in step S150), this junction ode 110 is determined as a first communication destination, that is, a first junction node 1101 (step S160), and then, the sender node 200 makes a communication path with the first junction node 1101 (see an arrow 250E in FIG. 2 and step S180 in FIG. 3).

If the junction node 110 to which the sender node 200 made access is busy (YES in step S150), the sender node 200 randomly selects any one junction node 110 among the remaining (N−1) junction nodes, and then, makes access to the thus selected junction node (step S170) to thereby judge whether the selected junction node 110 is busy or not (step S150).

If the N junction nodes 110 are all busy, the sender node 200 picks up again N junction nodes 110 among the junction nodes 110 other than the firstly picked-up N junction nodes 110, and then, repeatedly carries out the above-mentioned process (steps S150 to S170) for finding out a non-busy junction node 110. The thus found-out non-busy junction node is determined as a first communication destination, that is, a first communication node 1101 (step S160). Then, the sender node 200 makes a communication path with the first junction node 1101 (see an arrow 250E in FIG. 2 and step S180 in FIG. 3).

Each of the junction nodes 110 is designed to store therein a final judgment logic for judging whether itself is a final junction node or not. Each of the junction nodes 110 having been determined as a junction node partially defining a communication path judges whether itself is a final junction node, based on both the information stored in itself and the information having been received from the immediately previous junction node, in accordance with the final judgment logic (step S190).

Judgment in accordance with the final judgment logic, that is, judgment as to whether a certain junction node or not is a final one is carried out as follows, for instance.

(A) A certain junction node is judged to be a final one when a number of junction nodes defining a communication path before the communication path has reached the certain junction node is equal to K wherein K is an integer equal to or greater than 1.

Herein, a threshold K may be set to be a constant or a variable.

In the case that K is set to be a constant, K is determined to be high sufficiently to ensure security in communication. In an exemplary process of determining K, the meshed virtual private network system 100 is experimentally operated, and then, K is suitably determined, based on the result of the experimental operation, in accordance with various parameters such as a communication speed, geolocation information, and a distance to the receiver node 300 from the sender node 200. Herein, geolocation information, that is, information showing where it is now is included in the information to be recorded into the database 120 by the sender node 200, each of the junction nodes 110 and the receiver node 300.

In the case that K is set to be a variable, K is suitably determined each time communication environment has changed, a certain period of time has lapsed, and so on.

(B) A certain junction node is judged to be a final one when a certain period of time T has lapsed when a communication path has reached the certain junction period after beginning of building the communication path.

Similarly to the above-mentioned threshold K, the certain period of time T may be set to be a constant or a variable.

The first junction node 1101 judges as to whether itself is a final junction node or not in accordance with the final judgment logic (step S190).

If the first junction node 1101 judges that I am a final junction node (YES in step S190), the first junction node 1101 makes access to the receiver node 300 (step S280), as mentioned later.

If the first junction node 1101 judges that I am not a final junction node (NO in step S190), the first junction node 1101 carried out the negotiations having been made between the sender node 200 and itself, to a randomly selected junction node 110 (see an arrow 250F in FIG. 2 and step S200 in FIG. 3).

The first junction node 1101 picks up a second communication destination, that is, a second junction node 1102 in accordance with the procedure with which the sender node 200 has determined the first junction node 1101 (step S210).

After determination of the second junction node 1102, the first junction node 1101 transmits information stored in itself to the second junction node 1102 (see an arrow 250F in FIG. 2 and step S220 in FIG. 3). Herein, the information stored in the first junction node 1101 includes the information having been received from the sender node 200.

Then, the second junction node 1102 judges whether I am a final junction node or not in the same manner as the first junction node 1101 did (step S230).

If the second junction node 1102 judges that I am not a final junction node (NO in step S230), the second to seventh junction nodes 1102 to 1107 each carries out the above-mentioned negotiations to an randomly selected junction node other than the junction nodes already having defined a communication path (step S240) to thereby pick up third to eighth junction nodes 1103 to 1108, respectively, and then, makes a communication path with the thus picked-up third to eighth junction nodes 1103 to 1108, respectively (see an arrow 250G in FIG. 2 and step S250 in FIG. 3).

After the third to eighth junction nodes 1103 to 1108 have been determined, the second to seventh junction nodes 1102 to 1107 each transmits node information stores in itself to the next third to eighth junction nodes 1103 to 1108, respectively, like the first junction node 1101 transmitted the node information stored in itself to the second junction node 1102 (see an arrow 250G in FIG. 2 and step S260 in FIG. 3). Herein, the node information stored in each of the second to seventh junction nodes 1102 to 1107 includes all node information having been stored in all of the junction nodes present in the communication path defined so far.

Then, a junction node having been determined as a next communication destination judges whether I am a final junction node in accordance with the final judgment logic (step S270).

If the junction node judges that I am not a final junction node (NO in step S270), the process for finding a next communication destination is repeatedly carried out (steps S240 to S260).

If the junction node judges that I am a final junction node (YES in step S270), the process for finding a next communication destination ends, and then, the junction node makes access to the receiver node 300, as mentioned below (step S280).

It is supposed, for instance, that the eighth junction node 1108 recognized itself as a final junction node, based on the information having been stored in the first to seventh junction nodes 1101 to 1107 and transmitted thereto, in accordance with the final judgment logic. In such a case, the eighth junction node 1108 judged by itself to be a final junction node makes access to the receiver node 300 to thereby establish a communication path with the receiver node 300 (see an arrow 25011 in FIG. 2 and step S290 in FIG. 3).

In a case that the receiver node 300 is comprised of an external server such as website, for instance, the eighth junction node 1108 makes access to public internet (step S280) to thereby establish a communication path with the receiver node 300 through a predetermined port (step S290). Then, communication is made between the eighth junction node 1108 and the receiver node 300.

As an alternative, the eighth junction node 1108 may make P2P (peer to peer) access to the receiver node 300 in place of making access to internet (step S280). It should be noted that a common application for making P2P access is necessary to be installed in both the sender node 200 and the receiver node 300.

When the eighth node 1108 is connected in P2P to the receiver node 300, an entire communication path, that is, a communication path to the receiver node 300 from the sender node 200 through the first to eighth junction nodes 1101 to 1108 is defined with VPN connection.

In such a manner as mentioned above, the sender node 200 and the receiver node 300 can make communication to each other through a communication path defined with the randomly picked-up first to eighth junction nodes 1101 to 1108.

When the sender node 200 and the receiver node 300 intend to make communication with each other, negotiation is generally carried out between them. However, negotiation is not carried out in such cases as described below, for instance.

When the sender node 200 is going to make communication with the receiver node 300, it is judged whether negotiation is carried out or not (step S300).

If negotiation is to be carried out (YES in step S300), the sender node 299 makes connection to a port having a predetermined port number, and the receiver node 300 monitoring the port randomly picks up a port number N among port numbers predetermined by a daemon process thereof. The picked-up port number N is transmitted to the sender node 200 from the receiver node 300 (step S310).

The sender node 200 makes access to the port number N in a predetermined period of time, and established a communication path to the receiver node 300 through a port having the port number N. Thus, the sender node 200 is now able to make communication with the receiver node 300 (step S320).

The sender node 200 may carry out an authentication process to the receiver node 300 by means of an authentication protocol for enhancing security, if necessary.

Negotiation is not carried out, for instance, when a predetermined port cannot be determined, or a port to which the sender node 200 makes first access is required to be randomly picked up (NO in step S300).

In the case of not carrying out negotiation, the sender node 200 attempts to make communication to a port randomly selected among predetermined ports having N to (N+M) port numbers, that is, (M+1) predetermined ports, wherein N and M are integers. If the selected port is busy, the sender node 200 again randomly selects another port, and attempts to make communication to the port.

The receiver node 300 carries out a daemon process to all the ports having N to (N+M) port numbers (step S340). Thus, the sender node 200 can make a communication path with the receiver node 300 through a port number to which the sender node 200 and the receiver node 300 have commonly made access, and hence, the sender node 200 can make communication with the receiver node 300 (step S320).

In the case of not carrying out negotiation, the sender node 200 may carry out an authentication process to the receiver node 300 by means of an authentication protocol, if necessary.

In the meshed virtual private network system 100 in accordance with the present embodiment, each of the junction nodes 110 can act as a VPN server through the above-mentioned process. Since each of the junction nodes 110 functions as a VPN server, it is possible to solve the defect of a conventional system in which each of junction nodes is comprised of a fixed server.

It should be noted that the structure of the meshed virtual private network system 100 in accordance with the present embodiment is not to be limited to the above-mentioned one, and various modification and/or improvement may be applied thereto.

A number of the junction nodes 110 passing a route defined with the first to eighth junction nodes 1101 to 1108 is not to be limited to 8 shown in the above-mentioned embodiment. A number of the junction nodes 110 used for a communication route is optimally determined in accordance with circumstances, and further, an optimal route to the receiver node 300 from the sender node 200 is determined in accordance with circumstances.

Furthermore, the database 120 may be comprised of any device, if data can be written into and read out of the device. Considering non-manipulation of data and robustness in security, it is most preferable that the database 120 is comprised of a block-chain. In particular, data can be protected with high security by storing data into a block-chain in dispersion.

The junction nodes 110 defining the meshed virtual private network system 100 may be designed to be comprised of any device, if it is capable of making radio-signal communication. For instance, a personal computer used in home or companies may be used as the junction node 110. However, it should be noted that it is preferable that each of the junction nodes 110 is comprised of a cellular phone, and it is most preferable that each of the junction nodes 110 is comprised of an IoT device having a function of making radio-signal communication. Herein, the term "IoT device" conceptually includes a cellular phone.

A cellular phone is moving at real-time unlike a fixed server which cannot move from a predetermined position. A cellular phone is used by people in daily lives all over the world, and hundreds of millions of cellular phones are globally used. By using cellular phones of persons who agreed to use their phones as a junction node, among the hundreds of millions of cellular phones, tens of to hundreds of millions of cellular phones work as the junction nodes 110, resulting in that a shared memory type massively parallel computer can be virtually accomplished.

Figure 4:
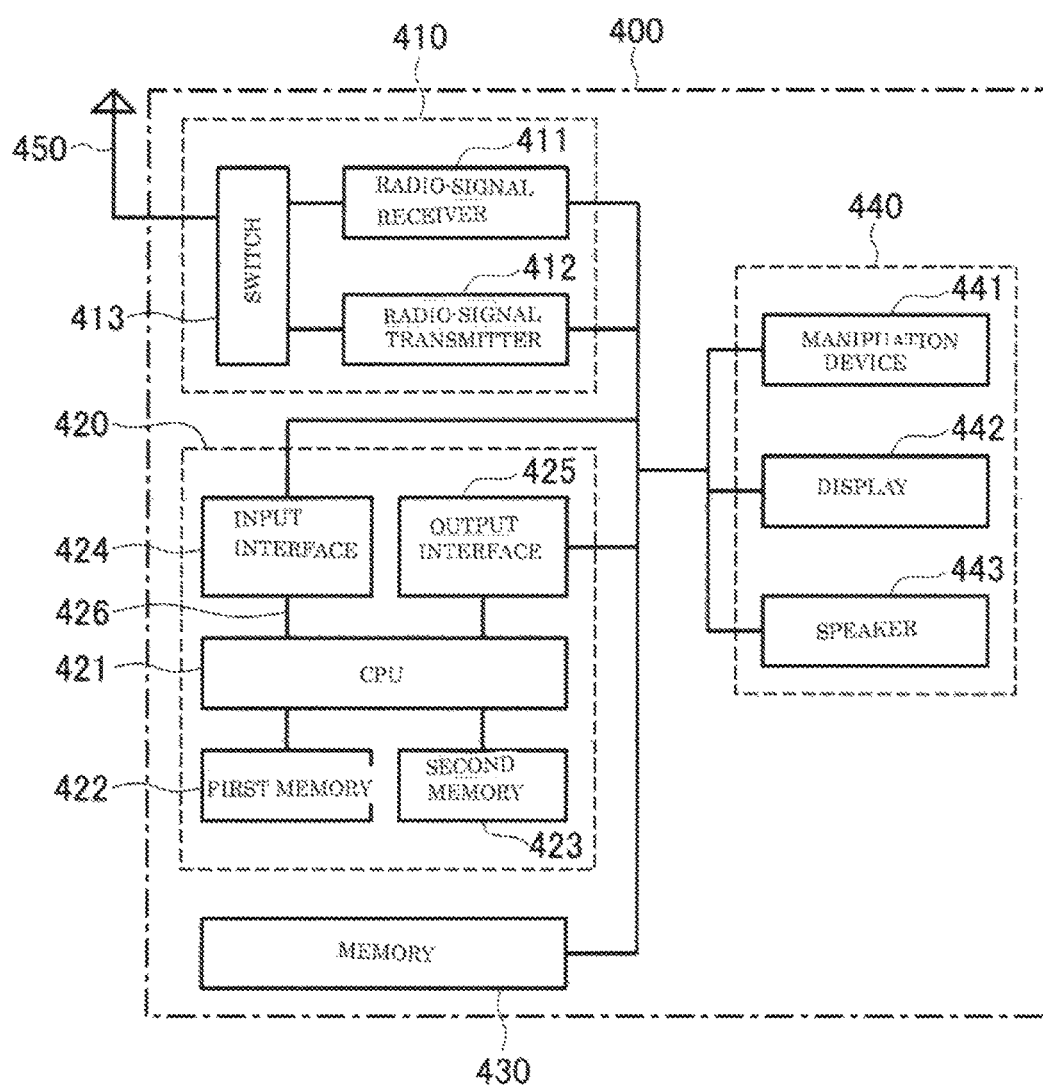
FIG. 4 is a block diagram showing an exemplary structure of a cellular phone.

FIG. 4 is a block diagram illustrating an exemplary structure of a cellular phone.

A cellular phone 400 is designed to include a communication unit 410, a control unit 420, a memory 430, an input-output (IO) unit 440, an antenna 450, and a buttery (not illustrated) providing electric power to those units, for instance.

The communication unit 410 is connected to the antenna 450, and transmits data to and receives data from another cellular phone in radio-signal communication.

The communication unit 410 includes a radio-signal receiver 411, a radio-signal transmitter 412, and switch 413.

The radio-signal receiver 411 demodulates data received from another cellular phone, and then, transmits the demodulated data to the control unit 420. The radio-signal transmitter 412 modulates data output from the control unit 420, and then, transmits the modulated data to another cellular phone through the antenna 450. The switch 413 receives a signal output from the control unit 420, and exchanges a transmission mode to a receipt mode and vice versa in accordance with the received signal.

As illustrated in FIG. 4, the control unit 420 is comprised of a central processing unit (CPU) 421, a first memory 422 comprised of a read only memory (ROM), a second memory 423 comprised of a random access memory (RAM), an input interface 424 through which commands and/or data having been input into the control unit 420 are transmitted to the central processing unit 421, an output interface 425 through which a result of steps having been executed by the central processing unit 421 is output, and buses 806 through which the central processing unit 421 is electrically connected with the first memory 422, the second memory 423, the input interface 424, and the output interface 425.

The first memory 422 stores therein both a program for causing the central processing unit 421 to execute the steps having been explained with reference to FIG. 3, and unrewritable data.

Such a program may be presented through a non-transitory storage medium readable by a computer.

In the specification, the term "storage medium" means any medium which can store or record data or programs therein. The term "storage medium" includes, for instance, a disk-shaped recorder such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk, a memory chip such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk, and any other suitable means for storing a program therein.

A storage medium storing a program causing each of the junction nodes 110 to execute the steps as shown in FIG. 3 may be accomplished by programming functions of the above-mentioned steps with a programming language readable by a computer, and recording the program in a storage medium such as the above-mentioned ones A hard disc equipped in a server may be employed as a storage medium. It is also possible to accomplish the storage medium in accordance with the present invention by storing the above-mentioned computer program in such a storage medium as mentioned above, and reading the computer program by other computers through a network.

The second memory 423 stores therein various data and parameters, and presents a working area to the central processing unit 421. That is, the second memory 423 stores data temporarily necessary for the central processing unit 421 to execute the program.

The central processing unit 421 reads the program out of the first memory 422, and executes the program. Thus, the central processing unit 421 operates in accordance with the program stored in the first memory 422. In the present embodiment, the first memory 422 stores therein a program for executing the process shown in FIG. 3, that is, the process for causing each of the junction nodes 110 to work as a VPN server. The central processing unit 421 executes the steps shown in FIG. 3 in accordance with the program.

The IO unit 440 includes a manipulation device 441, a display 442, and a speaker 443.

The manipulation unit 441 is comprised of a ten-key pad, for instance. Various data is input into the cellular phone 400 through the manipulation unit 441.

The display 442 is comprised of a liquid crystal display (LCD), for instance. The display 442 displays computation results carried out by the control unit 420, and various data.

Audio data received from another cellular phone is output through the speaker 443.

The memory 430 works as an external memory for the control unit 420. Computation results carried out by the control unit 420, and various data are stored in the memory 430.

The correspondence between the action in the meshed virtual private network system 100 illustrated in FIG. 1 and the elements of the cellular phone 400 is as follows.

The communication unit 410, in particular, the radio-signal transmitter 412 acts as a unit (a first unit) for writing on-line/off-line status relating information into the database 120.

The communication unit 410 and the control unit 420 work as a unit (a second unit) for establishing a communication among the junction nodes 110, between the junction nodes 110 and the sender node 200, and further between the junction nodes 110 and the receiver node 300.

The communication unit 410 and the control unit 420 work as a unit (a third unit) for transmitting data to the junction nodes 110, the sender node 200 and the receiver node 300.

Furthermore, the control unit 420 works as a unit (a second unit) for carrying out the final judgment logic, that is, judging whether a certain junction node 110 is a final one or not.

It is possible to have various advantages by designing each of the junction nodes 110 to be comprised of the cellular phone 400.

A cellular phone to be used as the cellular phone 400 in the meshed virtual private network system 100 is a cellular phone all over the world which is kept in a condition for making communication any time, or a cellular phone temporarily connected to Wi-Fi. Since those cellular phones act as a VPN server, it is no longer necessary to use conventional VPN servers, ensuring overwhelming cost performance.

For instance, the current VPN service is operated by thousands of to tens thousands of globally existing VPN servers. Since the present embodiment makes it possible to cause a junction node to act as a VPN server, those existing expensive VPN servers are no longer necessary to be used, ensuring high cost performance.

Furthermore, device resource can be utilized more effectively by means of shared memory type large-quantity thread, as follows.

Hereinbelow is explained a simulation on an existing OS (Operating System).

A MIMD (Multiple-Instruction-stream, Multiple-Data-stream) type SMPVM (Super Massively Parallel Virtual Machine) is caused to work on a central processing unit (CPU) of the cellular phone 400, for instance, on CPU 421 illustrated in FIG. 4. A central processing unit, regardless of whether it is a single CPU or a multiple CPU, operates a single PVM (parallel virtual machine). It is supposed that about 3000 to about 5000 LWPs (light-weight process) are setup per one CPU in SMPVM. A number of setups of LWPs is in the range of about 1,000 to about 100,000 in dependence on a capacity of CPU.

For this purpose, there is utilized an existing Mach (Multiple Asynchronously Communication Hosts) type thread. As a Mach type thread, there may be used Linux, Windows or Mac OS, for instance. Since about 30 to about 50 light-weight processes (LWP) are concurrently setup in a Mach type thread, about 100 LWPs are operated per a thread.

3000/30 (or 5000/50)=100

That is, a thread virtually acts as a CPU. For instance, Linux is said to be a middle wear in which 100 virtual threads operate on a single thread.

Since MIMD type SMPVM makes it unnecessary to carry out division of a memory space between processes and serialization of procedure, such as tunneling in communication and acquisition of port number 80, in most of internet service such as Web server and VPN service, it is now possible to simultaneously setup a lot of threads by parallelization.

As explained above, tens of to hundreds of thousands of cellular phones define a MIMD type SMPVM as a single machine by designing the junction nodes 110 to be comprised of the cellular phone 400, and resultingly, it is no longer necessary to use super-computers and clouds both now being used.

In particular, a merit provided by using the cellular phones 400 as the junction nodes 110 can be enhanced after 5G (5th Generation) mobile communication system characterized by high speed, high capacity and low latency has spread in the world.

The cellular phones 400 used as the junction nodes 110 in the meshed virtual private network system 100 are limited to those registered in advance. For instance, the cellular phones 400 to be used as the junction nodes 110 may be recruited, as follows.

(1) Fee for using a VPN communication application to be used in the meshed virtual private network system 100 may be discounted or not charged to a user who agrees to use his/her cellular phone as a VPN junction node when the user starts up his/her cellular phone.

(2) When a VPN communication application to be used in the meshed virtual private network system 100 is installed into "iPhone" or "Android phone" from "App Store" or "Play Store", respectively, a mode of agreeing to use his/her cellular phone as a VPN junction node is set to be a default, and provision of a function of a VPN junction node is suspended to a user already having been charged.

(3) Similar to mining of a digital currency such as bitcoin (BTC), a reward is paid or cashable points are presented to a user who agrees to use his/her cellular phone as a VPN junction node, in dependence on a number of bits having passed through his/her cellular phone.

(4) Making a license contract with cellular phone manufacturers and/or router manufacturers, a VPN communication application to be used in the meshed virtual private network system 100 is initially installed in their products, that is, network devices.

It should be noted that though the cellular phone 400 is used as an example in the above-mentioned embodiment, any radio-signal communication device may be used in place of the cellular phone 400, if it is mobile. For instance, there may be used a note-type personal computer, a tablet and a router in place of the cellular phone 400.

In particular, an IoT (Internet of Things) device is preferably used in place of the cellular phone 400. Herein, an IoT device includes, for instance, domestic electrical appliances such as a television set, a digital camera, a DVD player, an air-conditioning system and a hot-water supply system in buildings, meters such as a gas meter and an electric meter, various sensors, lighting systems, medical appliances, and transportation apparatuses such as a train, an automobile and a drone, all of which are connected to internet.

In the above-mentioned embodiment, the meshed virtual private network system 100 is designed to singly include the sender node 200 and the receiver node 300, but they are not to be limited to a single node. The meshed virtual private network system 100 may be designed to include a plurality of the sender nodes 200 and the receiver nodes 300.

For instance, in the case of press conference, various announcements such as announcement of new products and E-learning, the sender node 200 is set to be a single node, and the receiver nodes 300 is set to be a plurality of nodes, so that motion-picture distribution is carried out in a one-to-many mode. As an alternative, in the case of telework and a remote meeting, both the sender node 200 and the receiver node 300 are set to be a plurality of nodes, so that motion-picture distribution is carried out in a many-to-many mode. Real-time distribution is required in the both cases. Since a hybrid P2P meshed virtual private network, in which a distribution server is not a bottle-neck, can be accomplished in accordance with the above-mentioned embodiment, it is possible to carry out distribution of motion-pictures with high security.

The exemplary advantages obtained by the above-mentioned exemplary embodiments are described hereinbelow.

The above-mentioned exemplary embodiments enable junction nodes defining a meshed virtual private network system to act as a VPN server. Thus, it is possible to solve the above-mentioned problems caused in a conventional system including junction nodes each comprised of a fixed server.

Furthermore, since it is possible to use a cellular phone ordinarily used in daily lives, as a junction node in place of a VPN server employed only in VPN service, it is no longer necessary to use existing expensive VPN servers, ensuring that high cost performance can be accomplished and device resources such as a VPN server can be effectively used.

In addition, security in communication can be much improved by defining a meshed virtual private network with a communication path defined by a plurality of junction nodes each acting as a VPN server.

Furthermore, since a junction node can be comprised of an IoT device, for instance, a resultant VPN meshed virtual private network system is capable of much enhancing security, and further, promoting efficient use of device resources.

INDUSTRIAL APPLICABILITY

The present invention is applicable most effectively to a meshed virtual private network system, and further, is suitable to an existing VPN service.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2020-088086 filed on May 20, 2020 including specification, claims, drawings and summary is incorporated herein by reference in its entirety.

What is claimed is:

1. A meshed virtual private network system including:
L junction nodes each comprising a device being capable of making a radio virtual private network communication and each being registered in advance, wherein L is an integer equal to or greater than 2; and
a database,
the meshed virtual private network system making communication to a receiver node from a sender node through the junction nodes,
wherein
the L junction nodes each writes either on-line status relating information to the database when it is on-line, or off-line status relating information to the database when it is off-line,
when the sender node intends to make communication to the receiver node through the junction nodes, the sender node makes access to the database to pick up N junction nodes among junction nodes being on-line, wherein N is an integer equal to or greater than 2,
the sender node repeats making access to any one of the N junction nodes, and making access to any one of the remaining (N−1) junction nodes, if the junction node to which the sender node made first access is busy, to thereby pick up a non-busy junction node as a first junction node, and then, establish a communication path to the first junction node,
the first junction node carries out a negotiation having been carried out between the sender node and the first junction node, to another junction node to thereby pick up a second junction node and establish a communication path to the second junction node,
the first junction node transmits information stored in itself to the second junction node, the information including information having been received from the sender node,
thereafter, the M-th junction node repeats carrying out the negotiation to a junction node other than the first to the (M−1)-th junction nodes to thereby pick up a (M+1)-th junction node and establish a communication path to the (M+1)-th junction node, wherein M is an integer equal to or greater than 2,
the M-th junction node transmits information to the (M+1)-th junction node, the information including both information stored in itself and information stored in the first to the (M−1)-th junction nodes present in the communication path having been established so far,
a junction node which recognizes itself as a final junction node, based on the information having been received from the immediately previous junction node, in accordance with a judgment logic for judging whether a junction node is a final one, makes access to the receiver node,
each of the junction nodes functions as a virtual private network server.

2. The meshed virtual private network system as set forth in claim 1, wherein the sender node, when the N junction nodes are all busy, carries out the same process to remaining junction nodes other than the N junction nodes.

3. The meshed virtual private network system as set forth in claim 1, wherein each of the junction nodes includes a radio-signal communication device moving at real-time.

4. The meshed virtual private network system as set forth in claim 1, wherein each of the junction nodes includes a cellular phone.

5. The meshed virtual private network system as set forth in claim 1, wherein each of the junction nodes includes an IoT device.

6. The meshed virtual private network system as set forth in claim 1, wherein the database includes a block-chain.

7. A method of causing a junction node to act as a virtual private network server in a meshed virtual private network including a plurality of junction nodes each comprising a device being capable of making a radio virtual private network communication, and a database, the meshed virtual private network making communication to a receiver node from a sender node through the junction nodes,
the method including:
as a first process, writing either on-line status relating information to the database when each of the junction nodes is on-line, or off-line status relating information to the database when each of the junction nodes is off-line, the first process being carried out by each of the junction nodes;
as a second process, when the sender node intends to make communication to the receiver node through the junction nodes, making access to the database to pick up N junction nodes among junction nodes being on-line, wherein N is an integer equal to or greater than 2, the second process being carried out by the sender node;
as a third process, repeating making access to any one of the N junction nodes, and making access to any one of the remaining (N−1) junction nodes, if the junction node to which the sender node made first access is busy, to thereby pick up a non-busy junction node as a first junction node, and then, establish a communication path between the sender node and the first junction node, the third process being carried out by the sender node;
as a fourth process, carrying out a negotiation having been carried out between the sender node and the first junction node, to another junction node to thereby pick up a second junction node and establish a communication path between the first junction node and the second junction node, the fourth process being carried out by the first junction node;
as a fifth process, transmitting information stored in the first junction node to the second junction node, the information including information having been received from the sender node, the fifth process being carried out by the first junction node;
as a sixth process, repeating carrying out the negotiation to a junction node other than the first to a (M−1)-th junction nodes to thereby pick up a (M+1)-th junction node and establish a communication path between a M-th junction node the (M+1)-th junction node, wherein M is an integer equal to or greater than 2, the sixth process being carried out by the M-th junction node;

as a seventh process, transmitting information to the (M+1)-th junction node, the information including both information stored in the M-th junction node and information stored in the first to the (M−1)-th junction nodes present in the communication path having been established so far, the seventh process being carried out by the M-th junction node; and as an eighth process, making access to the receiver node, the eighth process being carried out by a junction node which recognizes itself as a final junction node, based on the information having been received from the immediately previous junction node, in accordance with a judgment logic for judging whether a junction node is a final one.

8. The method as set forth in claim 7, wherein when the N junction nodes are all busy in the third process, the second and third processes are carried out to junction nodes other than the N junction nodes.

9. The method as set forth in claim 7, wherein each of the junction nodes includes a radio-signal communication device moving at real-time.

10. The method as set forth in claim 7, wherein each of the junction nodes includes a cellular phone.

11. The method as set forth in claim 7, wherein each of the junction nodes includes an IoT device.

12. A junction node to be used in a meshed virtual private network including a plurality of junction nodes each comprising a device being capable of making a radio virtual private network communication, one or more processors, and a database, the meshed virtual private network making communication to a receiver node from a sender node through the junction nodes, wherein the junction node is configured to write either on-line status relating information to the database when the junction node is on-line, or off-line status relating information to the database when the junction node is off-line, and wherein when the sender node intends to make communication to the receiver node through the junction nodes, the sender node makes access to the database to pick up N junction nodes among junction nodes being on-line, wherein N is an integer equal to or greater than 2, and then, repeats making access to any one of the N junction nodes, and making access to any one of the remaining (N−1) junction nodes, if the junction node to which the sender node made first access is busy, to thereby pick up a non-busy junction node as a first junction node, thereafter, the second unit in the first junction node establishes a communication path to the sender node, the first junction node further carries out a negotiation having been carried out between the sender node and the first junction node, to another junction node to thereby pick up a second junction node and establish a communication path to the second junction node, the first junction node transmits information stored in the first junction node to the second junction node after the communication path has been established between the first and second junction nodes, the information including information having been received from the sender node, a M-th junction node repeats carrying out the negotiation to a junction node other than the first to a (M−1)-th junction nodes after a communication path with the immediately previous (M−1)-th junction node has been established, to thereby pick up a (M+1)-th junction node and establish a communication path to the (M+1)-th junction node, wherein M is an integer equal to or greater than 2, the M-th junction node transmits information to the (M+1)-th junction node after a communication path has been established between the M-th and (M+1)-th junction nodes, the information including both information stored in the M-th junction node and information stored in the first to the (M−1)-th junction nodes present in the communication path having been established so far, a junction node which recognizes itself as a final junction node, based on the information having been received from the immediately previous junction node, in accordance with a judgment logic for judging whether a junction node is a final one, establishes a communication path with the receiver node, and each of the junction nodes functions as a virtual private network server.

13. The junction node as set forth in claim 12, wherein each of the junction nodes includes a radio-signal communication device moving at real-time.

14. The junction node as set forth in claim 12, wherein each of the junction nodes includes a cellular phone.

15. The junction node as set forth in claim 12, wherein each of the junction nodes includes an IoT device.

16. A non-transitory storage medium readable by a computer and storing a program therein in a meshed virtual private network including a plurality of junction nodes each comprising a device being capable of making a radio virtual private network communication, and a database, the meshed virtual private network making communication to a receiver node from a sender node through the junction nodes, wherein the program is stored in each of the junction nodes, and causes each of the junction nodes to act as a virtual private network server, the program causes each of the junction nodes to carry out:

writing either on-line status relating information to the database when a junction node including the program is on-line, or off-line status relating information to the database when off-line;

when the sender node intends to make communication to the receiver node through the junction nodes, the sender node makes access to the database to pick up N junction nodes among junction nodes being on-line, wherein N is an integer equal to or greater than 2, and then, repeats making access to any one of the N junction nodes, and making access to any one of the remaining (N−1) junction nodes, if the junction node to which the sender node made first access is busy, to thereby pick up a non-busy junction node as a first junction node, causing the first junction node to establish a communication path to the sender node;

causing the first junction node to carry out a negotiation having been carried out between the sender node and the first junction node, to another junction node to thereby pick up a second junction node and establish a communication path between the first junction node and the second junction node;

causing the first junction node to transmit information stored in the first junction node to the second junction node, the information including information having been received from the sender node;

causing a M-th junction node to repeat carrying out the negotiation to a junction node other than the first to a (M−1)-th junction nodes to thereby pick up a (M+1)-th junction node and establish a communication path between the M-th junction node the (M+1)-th junction node, wherein M is an integer equal to or greater than 2;

causing the M-th junction node to transmit information to the (M+1)-th junction node, the information including both information stored in the M-th junction node and information stored in the first to the (M−1)-th junction nodes present in the communication path having been established so far; and causing a junction node which recognizes itself as a final junction node, based on the information having been received from the immediately previous junction node, in accordance with a judgment logic for judging whether a junction node is a final one, to make access to the receiver node.

* * * * *